Aug. 20, 1940.  R. RICHARDSON  2,212,170
PROPELLER BLADE
Filed Oct. 12, 1938
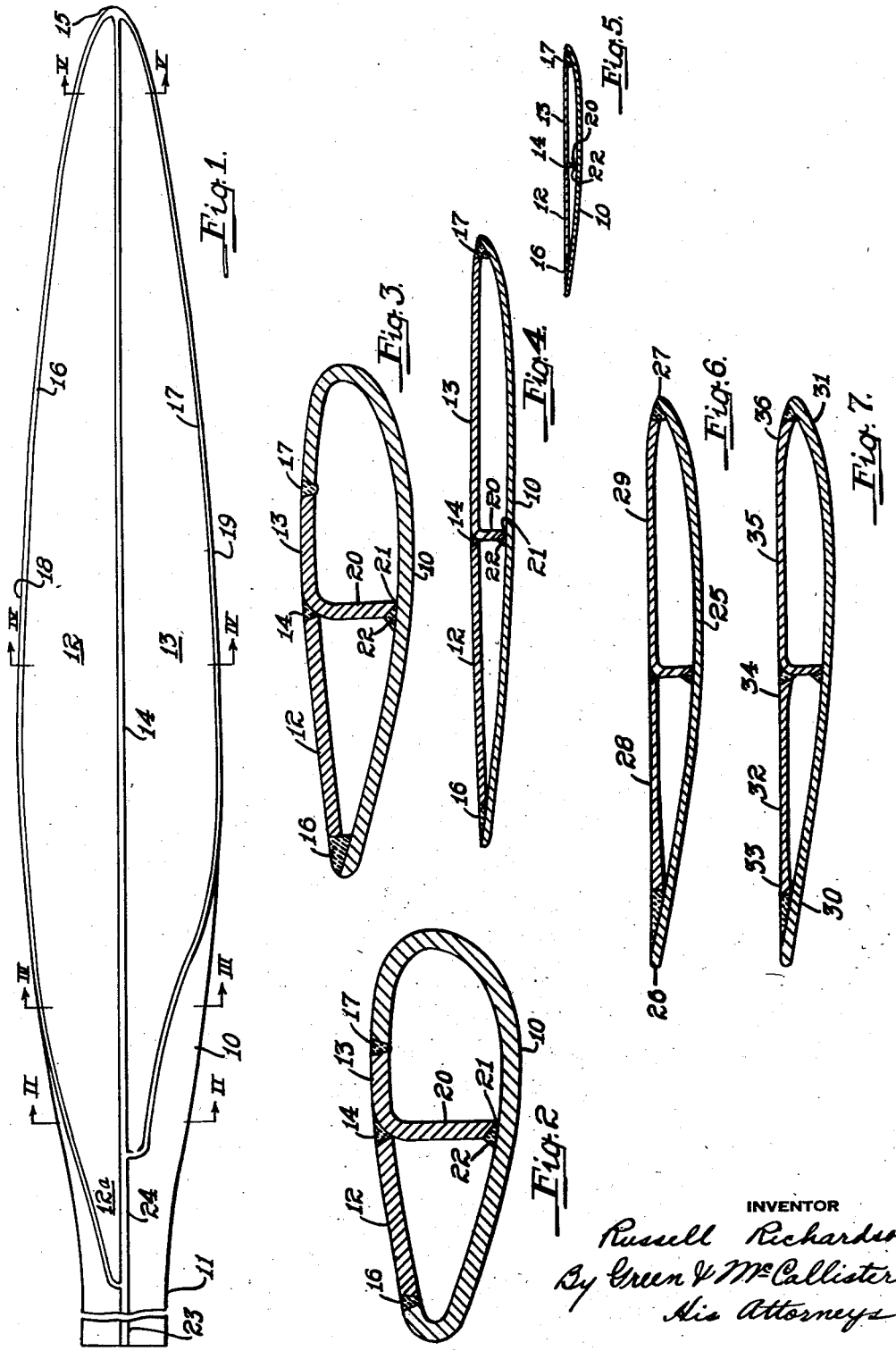
INVENTOR
Russell Richardson
By Green & McCallister
His Attorneys Patented Aug. 20, 1940

2,212,170

UNITED STATES PATENT OFFICE 2,212,170

PROPELLER BLADE

Russell Richardson, Bellevue, Pa., assignor, by mesne assignments, to Curtiss-Wright Corporation, New York, N. Y., a corporation of Delaware Application October 12, 1938, Serial No. 234,608

16 Claims. (Cl. 170—159)

This invention relates to aircraft propellers and more particularly to reinforced hollow metal blades for such propellers.

The patent art relating to aircraft propeller blades discloses a number of examples of hollow metal blades with internal centrally located and longitudinally extending stiffening ribs. Dicks Patent 1,713,500 of May 14, 1929, discloses such a blade and one object of this invention is the production of a blade of the Dicks type having an improved internal stiffening rib which is joined to the camber and thrust plate members thereof by continuous metal welds extending throughout the length of such stiffening rib.

Another object is the production of a hollow metal blade having an internal centrally located stiffening rib extending throughout the effective length of the blade and which is joined to the blade camber member by a fillet weld and to the blade thrust plate by an inlaid metal weld and wherein both such welds are continuous and extend throughout the length of the stiffening rib.

These as well as other objects I attain in the blade disclosed in the specification and illustrated in the drawing accompanying and forming part of this application.

In the drawing:

Figure 1 is a plan view of a propeller blade embodying this invention;

Figs. 2, 3, 4, and 5 are transverse sections taken on lines II—II, III—III, IV—IV and V—V respectively of Fig. 1; and Figs. 6 and 7 are typical transverse sections of a modified form of blade embodying this invention.

In making the hollow metal propeller blade of the Dicks patent two blanks sheared from steel plate-like material of uniform thickness are longitudinally tapered, the blank for the camber member from its shank forming portion to its opposite end and that for the thrust plate throughout its entire length. These tapered blanks are then trimmed and pressed one into the camber member and shank portion and the other into the thrust plate. The camber and thrust plate members are bonded together by inlaid metal welds which surround the thrust plate and lie wholly within the pressure face of the blade. The stiffening rib which is centrally located within the blade extends from the shank portion thereof to the blade tip and is welded to the camber member and thrust plate.

In the blade embodying this invention, the camber member 10 and blade shank 11 are preferably formed from a single blank as above described in connection with the blade of the Dicks patent. The thrust plate however instead of being formed from a single blank as in the blade of said patent is formed in two parts 12 and 13 and these parts are joined together along the median line of the pressure face of the blade by an inlaid metal weld 14, which extends from the blade shank 11 to the blade tip 15.

This two-part thrust plate is bonded to the camber member by inlaid metal welds 16 and 17 which together surround the thrust plate, lie wholly within the pressure face, as in the blade of the Dicks patent, and merge into weld 14 at the blade tip. Weld 16 lies adjacent the trailing edge 18 of the blade while weld 17 lies adjacent the leading edge 19 of the blade.

Thrust plate part 13 (that part adjacent leading edge 19) has its inner edge portion 20 bent (as shown in Figs. 2–5) so as to be substantially perpendicular to its main portion; the bend being made on a radius such as not to fatigue the metal. This angular portion 20 extends inwardly of the blade and toward the camber member and is of such contour that its free edge 21 throughout its entire length contacts with or lies close to the inner face of the camber member. When the blade parts are welded together (as shown in Figs. 2 to 5) this portion 20 forms my improved stiffening rib.

It will be apparent that either thrust plate part (such as parts 12 and 13) may be provided with this angular rib forming extension but I prefer to provide such extension on that part lying adjacent the leading edge of the blade as disclosed herein.

Longitudinal edge 21 of this angular rib forming portion is bonded to the camber member by means of a fillet weld 22 which is continuous throughout the length of this portion and is formed of deposited weld metal.

The tubular shank 11 of the blade is provided with a longitudinally extending seam having its edges bonded together by an inlaid metal weld 23. The weld lines up with inlaid metal weld 14 which bonds together the two thrust plate parts 12 and 13.

Part 12 of the thrust plate is longer than part 13 as shown in Fig. 1 and part 12a which extends toward the shank beyond part 13 is bonded to the adjacent portion of the camber member by an inlaid metal weld 24, which lines up with welds 14 and 23.

In constructing the blade of this invention, the camber member is preferably placed within a cradle with its open side up. Part 13 of the thrust plate is then placed in the position it is to occupy in the finished blade and is supported in such position by means of a collapsible mandrel. Weld 22 which joins the inner edge 21 of angular part 20 of thrust plate part 13 is then made. After weld 20 is completed, part 12 of the thrust plate is supported by means of another collapsible mandrel in the position it is to occupy in the finished blade. Weld 14 is then made, thus bonding parts 12 and 13 of the thrust plate into a rigid integral thrust plate structure; completing the stiffening rib and joining the thrust plate to the camber member by means of said rib. Welds 16 and 17 are then made and thereafter the collapsible mandrels are withdrawn through the open shank end of the blade.

In Fig. 6, the camber member 25 gradually increases in thickness from its longitudinal center to its edges 26 and 27. This is also true of the thrust plate made up of parts 28 and 29.

In Fig. 7 the camber member is of uniform thickness throughout the major part of its width but increases in thickness at its edge portions 30 and 31. Thrust plate part 32 adjacent the trailing edge of the blade increases in thickness at its edge portions 33 and 34 while thrust plate part 35 is only increased in thickness at its edge portion 36 adjacent the leading edge of the blade. In other respects these modified blade structures are the same as the blade illustrated in Figs. 1 to 5.

Having thus described my invention, what I claim as new and desire to secure by Letters Patent is:

1. A propeller blade comprising one face substantially defined by a unitary blank, an opposed face substantially defined by a plurality of blanks, welded joints connecting said blanks and a reinforcing rib extending from said opposed face to said unitary blank.

2. A propeller blade comprising one face substantially defined by a unitary blank, an opposed face substantially defined by a plurality of blanks, welded joints connecting said blanks and a reinforcing rib integral with a blank of said plurality of blanks extending from said opposed face to said unitary blank.

3. A propeller blade comprising one face substantially defined by a unitary blank, an opposed face substantially defined by a plurality of blanks, welded joints connecting said blanks and a reinforcing rib extending from said opposed face to said unitary blank, said rib being welded to blanks of both of said faces.

4. A propeller blade having a pressure face, a camber face, a leading edge and a trailing edge, a unitary blank defining one of said faces, the other of said faces being defined by a pair of blanks extending from a portion intermediate thereof substantially to said edges and a reinforcing rib extending from said intermediate portion to the opposite face.

5. A propeller blade having a pressure face, a camber face, a leading edge and a trailing edge, a unitary blank defining one of said faces, the other of said faces being defined by a pair of blanks extending from a portion intermediate thereof substantially to said edges and a reinforcing rib integral with one blank of said pair extending from said intermediate portion to the opposite face.

6. A propeller blade having a pressure face, a camber face, a leading edge and a trailing edge, a unitary blank defining one of said faces, the other of said faces being defined by a pair of blanks extending from a portion intermediate thereof substantially to said edges and a reinforcing rib integral with the blank of said pair which extends towards the leading edge, extending from said intermediate portion to the opposite face.

7. A propeller blade comprising a camber face defined by a unitary blank, a pressure face defined by a pair of blanks joined intermediate the face and a reinforcing rib extending from the intermediate portion of said pressure face to said camber face.

8. A propeller blade comprising a camber face defined by a unitary blank, a pressure face defined by a pair of blanks joined intermediate the face and a reinforcing rib integral with one blank of said pair extending from the intermediate portion of said pressure face to said camber face.

9. A propeller blade comprising a camber face, a pressure face, a leading edge and a trailing edge, a unitary blank substantially defining said camber face, a blank extending from said leading edge partially defining said pressure face, a blank extending from said trailing edge completing said pressure face and a reinforcing rib extending between said faces.

10. A propeller blade comprising a camber face, a pressure face, a leading edge and a trailing edge, a unitary blank substantially defining said camber face, a blank extending from said leading edge partially defining said pressure face, a blank extending from said trailing edge completing said pressure face and a reinforcing rib integral with one of the pressure face blanks extending between said faces.

11. A propeller blade comprising a camber face, a pressure face, a leading edge and a trailing edge, a unitary blank substantially defining said camber face, a blank extending from said leading edge partially defining said pressure face, a blank extending from said trailing edge completing said pressure face and a reinforcing rib integral with the first of said pressure face blanks extending between said faces.

12. A propeller blade comprising one face substantially defined by a unitary blank, an opposed face substantially defined by a plurality of blanks, welded joints connecting said blanks and a reinforcing rib extending from said opposed face to said unitary blank, one of said blanks also defining the root end of the blade.

13. A propeller blade comprising a camber face defined by a unitary blank, a pressure face defined by a pair of blanks joined intermediate the face and a reinforcing rib extending from the intermediate portion of said pressure face to said camber face and from the root end to the tip of the blade.

14. A propeller blade comprising pressure and camber faces defined by a plurality of blanks, welded joints adjacent the leading and trailing edges of the blade, an internal reinforcing rib extending between said faces and secured in position by welding, and a welded joint extending continuously along an intermediate portion of one of said faces.

15. A propeller blade comprising a camber face substantially defined by a single sheet of metal, a pressure face partially defined by a second sheet of metal and completed by a third sheet of metal, welded joints between said sheets along the leading and trailing edges and intermediate said pressure face and a reinforcing rib extending from the weld intermediate said pressure face to said camber face.

16. A propeller blade comprising a camber face substantially defined by a single sheet of metal, a pressure face partially defined by a second sheet of metal and completed by a third sheet of metal, welded joints between said sheets along the leading and trailing edges and intermediate said pressure face, and a reinforcing rib extending from the weld intermediate said pressure face and welded to said camber face.

RUSSELL RICHARDSON.